US011954129B2

(12) United States Patent
Mopur et al.

(10) Patent No.: US 11,954,129 B2
(45) Date of Patent: Apr. 9, 2024

(54) UPDATING DATA MODELS TO MANAGE DATA DRIFT AND OUTLIERS

(71) Applicant: Hewlett Packard Enterprise Development LP, Houston, TX (US)

(72) Inventors: Satish Kumar Mopur, Karnataka (IN); Sridhar Balachandriah, Karnataka (IN); Gunalan Perumal Vijayan, Karnataka (IN); Suresh Ladapuram Soundarajan, Karnataka (IN); Krishna Prasad Lingadahalli Shastry, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 295 days.

(21) Appl. No.: 17/225,805

(22) Filed: Apr. 8, 2021

(65) Prior Publication Data

US 2021/0365478 A1   Nov. 25, 2021

(30) Foreign Application Priority Data

May 19, 2020   (IN) .............................. 202041021065

(51) Int. Cl.
*G06F 16/28* (2019.01)
*G06F 18/214* (2023.01)
(Continued)

(52) U.S. Cl.
CPC .......... *G06F 16/285* (2019.01); *G06F 18/214* (2023.01); *G06F 18/2321* (2023.01);
(Continued)

(58) Field of Classification Search
CPC ............. G06F 16/285; G06F 18/24137; G06F 18/214; G06F 18/2433; G06F 18/2321; G06F 16/215

See application file for complete search history.

(56) References Cited

U.S. PATENT DOCUMENTS 9,165,051 B2   10/2015   Masud et al.
9,330,119 B2   5/2016   Chan et al.
(Continued)

FOREIGN PATENT DOCUMENTS

WO   WO-2020040777   2/2020
WO   WO-2020055783   3/2020

OTHER PUBLICATIONS

Panicucci, S. et al., A Cloud-to-edge Approach to Support Predictive Analytics in Robotics Industry, (Research Paper), Electronics 2020, Mar. 16, 2020, vol. 9, No. 3., 22 Pgs.

*Primary Examiner* — Etienne P Leroux
*Assistant Examiner* — Farhad Agharahimi
(74) *Attorney, Agent, or Firm* — Hewlett Packard Enterprise Patent Department

(57) ABSTRACT

The present invention relates to a system and a method for updating data models. Input data received from a data source and/or prediction data obtained from a data model is reduced based on baseline reference data to obtain a plurality of representative points. The plurality of representative points are clustered to generate a plurality of clusters. An outlier cluster is detected from the plurality of clusters based on a maximum distance of the plurality of clusters from a highest density cluster and/or comparison of quantity and values of the plurality of representative points with predefined rules. Data drift is identified based on changes in densities of the plurality of clusters. The data model is updated using information corresponding to the outlier cluster and the data drift.

20 Claims, 6 Drawing Sheets

(51) Int. Cl.
*G06F 18/2321* (2023.01)
*G06F 18/23213* (2023.01)
*G06F 18/2413* (2023.01)
*G06F 18/2433* (2023.01)

(52) U.S. Cl.
CPC .. *G06F 18/23213* (2023.01); *G06F 18/24137* (2023.01); *G06F 18/2433* (2023.01)

(56) References Cited

U.S. PATENT DOCUMENTS

| | | | |
|---|---|---|---|
| 2014/0180998 A1* | 6/2014 | Sarrafzadeh | G06F 16/2228 707/741 |
| 2015/0286707 A1* | 10/2015 | Levitan | G06F 16/9027 707/737 |
| 2017/0330109 A1 | 11/2017 | Maughan et al. | |
| 2017/0372232 A1 | 12/2017 | Maughan et al. | |
| 2018/0081913 A1* | 3/2018 | Suleiman | G06F 16/215 |
| 2018/0149855 A1* | 5/2018 | Chou | G02B 21/367 |
| 2020/0012900 A1* | 1/2020 | Walters | G06N 3/08 |
| 2021/0117415 A1* | 4/2021 | Sriharsha | G06F 9/544 |

* cited by examiner

UPDATING DATA MODELS TO MANAGE DATA DRIFT AND OUTLIERS

BACKGROUND

Edge computing is a distributed, open Information Technology (IT) architecture that features decentralized processing power, enabling, for example, mobile computing and Internet of Things (IoT) technologies. With the proliferation of computing devices at the edge, analytics of the mass data collected by these devices is possible using various methodologies, including machine learning algorithms. Because the edge devices have a limited amount of data processing capability, only a limited amount of analytics of the mass data is performed on the edge systems. A major portion of analytics of the mass data is performed at servers that are usually present over cloud networks, due to their immense data processing capability.

In some applications, at the cloud servers, the analysis being conducted on the gathered data can be used to train data models. Various machine learning algorithms are used to train data models that improve the functioning of the edge systems, as defined by certain parameters. However, in real-world applications, dynamic behaviors of the system may confound the decision-making of the data models. Dynamic behaviors may come from various sources, including sensor inefficiency, transient changes in measured parameter, mechanical wear and tear, and addition of new devices. The dynamic behaviors may appear in the data as data anomalies, which include outliers and data drift.

Data drift is the tendency over time for a parameter to move from one value to another. For example, a thermocouple may initially measure a temperature as +0.02 C above the actual temperature, but as the thermocouple ages, the measured temperature may drift to +1.08 C above the actual temperature.

Outliers may also be present in the input data streams, and such anomalies influence prediction behaviour obtained from the data models. The outliers may arise due to noise, false positive data streams, or malfunctioning of devices. Such data drifts and outliers degrade performance of the data models over time (i.e. reduce accuracy of the predicted results provided by the data models).

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles of the present disclosure. The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION OF THE INVENTION

Figure 1:
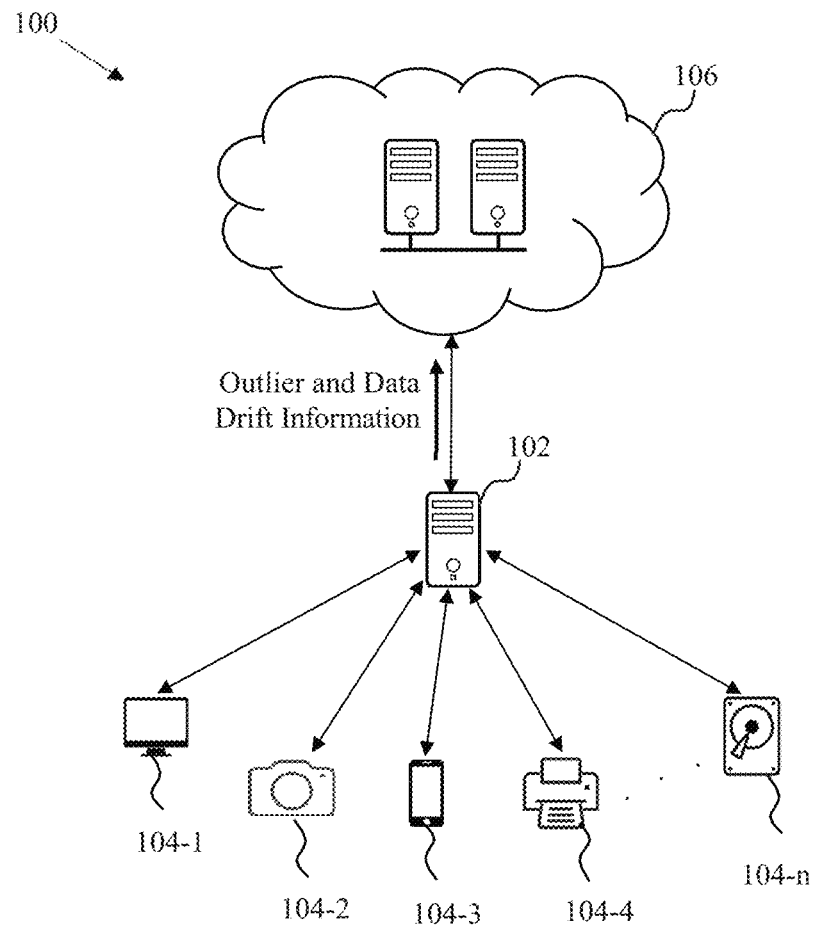
FIG. 1 illustrates a network connection diagram of a system for updating a data model, in accordance with an embodiment of the present disclosure.

Data models are trained over cloud servers to learn significant patterns associated with the mass data. Once trained, the data models are deployed at edge devices to predict events and/or values associated with the events. The predictions are utilized in forecasting, decision making, and/or other intended purposes. In practical scenarios, data drafts and outliers affect performance of the data models, wherein the events and/or values predicted by the data models become inaccurate as compared to the actual events or actual values.

By way of example, over cloud servers, a data model may be trained upon temperature values captured using temperature sensors installed in a Heating Ventilation and Air Conditioning (HVAC) system. The data model may be trained to predict temperature values related to the HVAC system. Upon being trained, the data model may be deployed over an edge device (for example, a local computer) of the HVAC system. Over a period of time, accuracy of the temperature values predicted by the data model may drop. Because the data drift and the outliers would affect the actual temperature values provided by the temperature sensors, the predicted temperature values would differ from the actual temperature values.

To prevent degradation of the data model trained for the exemplary HVAC system, due to the above said reasons, the current disclosure proposes detection of data drift and outliers. Preferably, the data drift and the outliers are detected at the edge system. The data drift and the outliers are detected at the edge system by applying data processing techniques on input data i.e. the temperature values recorded by the temperature sensors and/or the predicted temperature values received from the data model.

At first, the edge system i.e. the local computer processes the input data to obtain a plurality of representative points. Further, the input data may be reduced based on baseline reference data computed at the cloud server. The plurality of representative points may be clustered to generate a plurality of clusters. Each cluster of the plurality of clusters may comprise at least one representative point from the plurality of representative points.

Successively, an outlier cluster (also referred as the outliers) may be detected from the plurality of clusters. The outlier cluster may be detected based on a maximum distance of the plurality of clusters from a highest density cluster, and/or comparison of quantity and values of the plurality of representative points within a cluster of the plurality of clusters.

In a manner described above, the plurality of representative points may be generated and clustered for a predefined time period. After expiry of such predefined time period, changes in densities of the plurality of clusters may be identified. In one instance, the changes in densities may be determined by performing cross-correlation between respective clusters of the plurality of clusters generated before and after the predefined time period. Such changes in densities of the plurality of clusters may be stored as the data drift.

Information corresponding to the outliers and the data drift determined at the local computer may be transmitted to the cloud server, for updating the data model. Apart from updating the data model, the cloud server may also update the baseline reference data used for reducing the input data at the edge system. Transmission of only the information related to the data drift and the outliers to the cloud server allows network bandwidth saving compared to the transmission of entire mass data captured using the temperature sensors. Further, utilization of only the information related to the data drift and the outliers enables updating of the data model in a short time period. Thereupon, updated data model and updated baseline reference data may be provided to the edge system i.e. the local computer. The updated data model would deliver accurate temperature values related to the HVAC system. It must be understood that the aforementioned details are described to be utilized for an HVAC system merely as an example, and the all such details could be utilized in a similar manner with other systems for different applications.

Accordingly, the above described exemplary system and method provides updating of data models using information corresponding to data drift and outliers, instead of entire input data streams, thereby saving time and bandwidth required for updating the data models.

FIG. 1 illustrates a network connection diagram 100 of a system for updating a data model. An edge system 102 is shown to be connected with data sources 104-1 to 104-n (collectively referred as a data source 104). The edge system 102 receives data from the data source 104. A data model may need to be trained using the data received from the data source 104. For training the data model, the data received from the data source 104 may be transmitted to a cloud server 106 connected to the edge system 102 through a communication network. After the data model is trained at the cloud server 106, the data model may be deployed at the edge system 102, to process new data that may be received from the data source 104.

Post deployment of the data model on the edge system 102, when the new data becomes different from the data using which the data model is already prepared, relevant information may be extracted at the edge system 102. In an aspect, the edge system 102 may receive the new data from the data sources 104, and prediction data from a data model deployed at the edge system 102. The new data and the prediction data may be cumulatively referred as input data. The input data may be reduced to obtain a plurality of representative points.

A plurality of clusters may be generated from the plurality of representative points using a first data clustering technique. Among the plurality of clusters, an outlier cluster may be identified based on a maximum distance from a highest density cluster and comparison of quantity and values of the plurality of representative points with predefined rules.

Further, data drift may be identified from the input data, based on changes in densities of the plurality of clusters over a predefined period of time. The data drift and the outlier cluster may constitute the relevant information. Such relevant information may be transmitted to the cloud server 106 for updating the data model.

Figure 2:
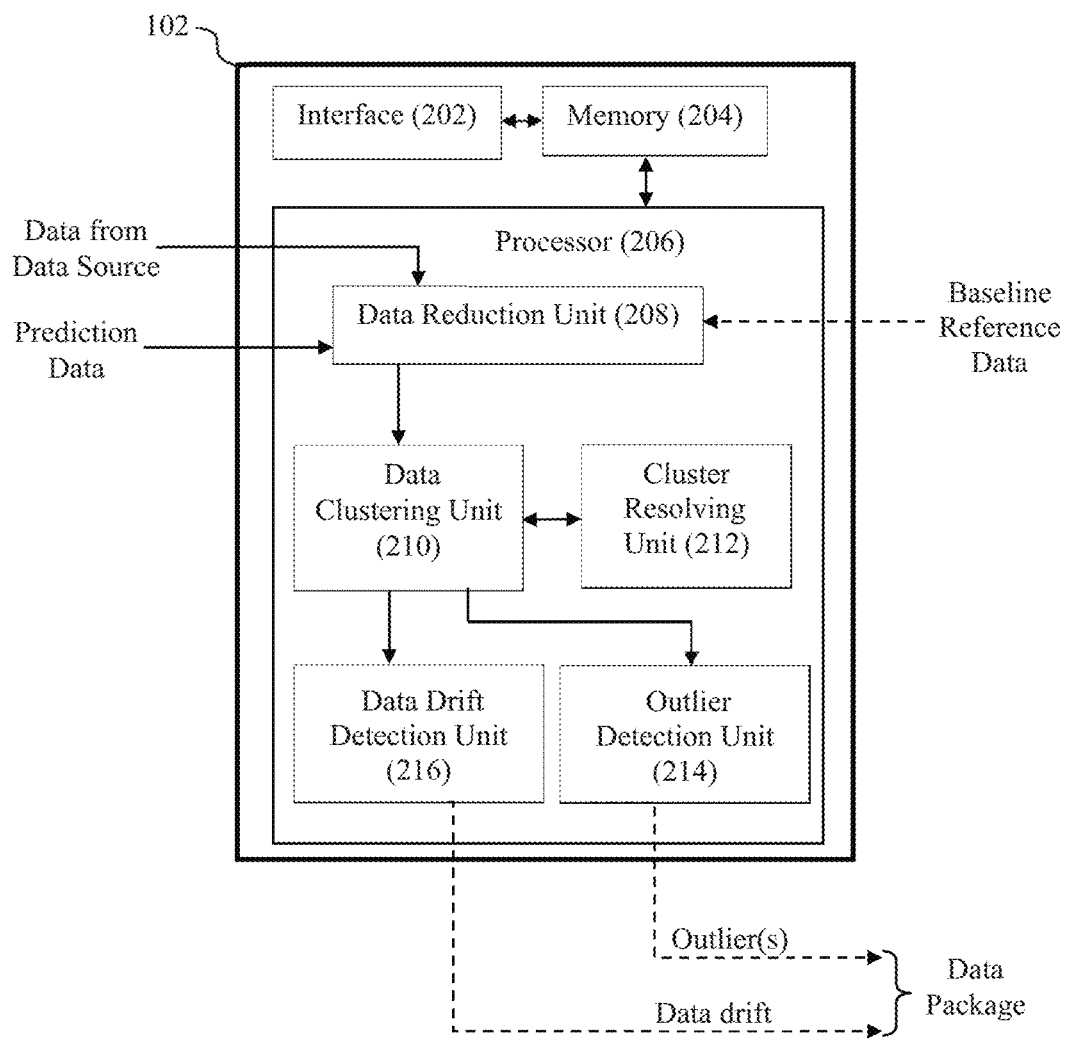
FIG. 2 illustrates a block diagram showing different components of an edge system for updating a data model, in accordance with an embodiment of the present disclosure.

FIG. 2 illustrates a block diagram showing different components of the edge system 102 for updating the data model, in accordance with an embodiment of the present disclosure. The edge system 102 may comprise an interface 202, a memory 204, and a processor 206. The processor 206 may comprise various units including a data reduction unit 208, a data clustering unit 210, a cluster resolving unit 212, an outlier detection unit 214, and a data drift detection unit 216.

To update the data model deployed at the edge system 102, at first, input data received from the data source 104 may be provided to the data reduction unit 208 of the edge system 102. Additionally, or alternatively, prediction data obtained from the data model may be provided as the input data to the data reduction unit 208. Thereupon, the data reduction unit 208 may reduce the input data. Reduction of the input data may indicate transformation of the input data to a data form that requires less space for depiction and processing compared to an original form of the input data. The process of reduction of the input data to obtain the plurality of representative points is explained below.

The input data i.e. data received from the data source 104 and/or from the data model deployed at the edge system 102 may be segmented. The input data may be segmented based on a predefined segment size. In one instance, the predefined segment size may be set based on variations present in values of the input data. For instance, if values of the input data vary continuously, the predefined segment size may be kept small. Alternatively, when values of the input data are nearly constant, the predefined segment size may be kept large. Corresponding to each segment of the input data obtained based on the predefined segment size, a representative point may be determined.

Figure 3:
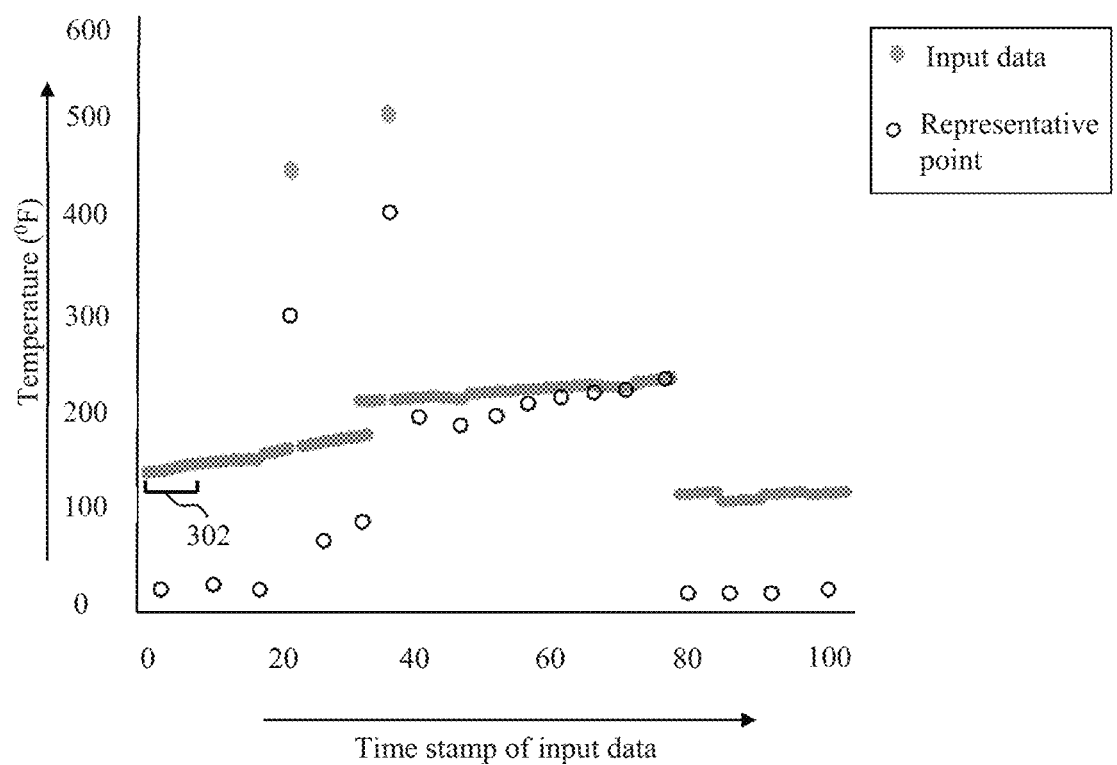
FIG. 3 illustrates an exemplary representation of a plurality of representative points obtained by reduction of input data, in accordance with an embodiment of the present disclosure.

An exemplary representation of the plurality of representative points obtained from reduction of the input data is illustrated in FIG. 3. FIG. 3 illustrates temperature values received as the input data over a period of time. Temperature values are utilized as an exemplary form of the input data; however, other data could be processed in a manner similar which is described in successive embodiments. A predefined segment size 302 is utilized to segment the input data. A unique segment identity may be assigned to each segment of the input data. Corresponding to each segment of the input data, a representative point is obtained, as illustrated in FIG. 3. It must be noted that a trend i.e, pattern of input data is preserved in the representative points.

Upon determining the representative points, Euclidian distances may be calculated between each segment of the input data and baseline reference data. The baseline reference data may be received by the data reduction unit 208 from the cloud server 106. The baseline reference data may include values of several factors derived from an ideal data cluster. Such values may include a cluster minimum value, a cluster maximum value, centroids, cluster densities for a defined set of input data, a set of values from a highest density cluster, and values for clustering techniques. Further details related to the baseline reference data are provided in later sections of the disclosure.

For each Euclidean distance determined between each segment of the input data and the baseline reference data, values may be determined. Signs may be assigned to the values based on position of the representative points with respect to the baseline reference data. Such values along with their signs may be augmented with a maximum negative value among the representative points.

The process of calculating the Euclidean distances, assigning signs to the Euclidean distances, and augmenting the Euclidean distances with the maximum negative value is now explained using exemplary values.

In an example, values of first segments of input data may be 40, 45, 50, and 55, and values of baseline reference data may be 50, 53, 55, and 54. In such case, Euclidean distance may be calculated as $(40-50)^2+(45-53)^2+(50-55)^2+(55-54)^2$, which equals to 190. Further, a sign to be assigned to such Euclidean distance may be determined based on a sum of the values of the first segments of input data and the values of the baseline reference data i.e. $(40-50)+(45-53)+(50-55)+(55-54)$, which totals to "−22". Because such value has a negative sign, the Euclidean distance having a negative sign i.e. −190 may be stored towards the first segments of input data.

In another example values of second segments of input data may be 60, 61, 60, and 53, and values of the baseline reference may be 50, 53, 55, and 54. In such case, Euclidean distance may be calculated as $(60-50)^2+(61-53)^2+(60-55)^2+(53-54)^2$, which equals to 190. Further, a sign to be assigned to such Euclidean distance may be determined based on a sum of the values of the second segments of input data and the values of the baseline reference data i.e. $(60-50)+(61-53)+(60-55)+(53-54)$, which totals to "+22". Because such value has a positive sign, the Euclidean distance having a positive sign i.e. +190 may be stored towards the second segments of input data.

In another aspect, some Euclidean distances for various time segments would have negative values. Such negative values would indicate a movement of representative points into a negative section of X-Y plane, specifically along the (−Y) axis. Downstream algorithms like clustering techniques provide more accurate results with positive values. To achieve such accurate results, a maximum negative value of Euclidean distance among the calculated Euclidean distances may be made non-negative using an offset value. The offset value may be equal to or greater than the maximum negative value. For example, Euclidean distances for various time segments of input data may be determined to be 100, 90, 70, 30, −10, 40, 50, 10, 30, −5, 20, and 25. Because "−10" is the maximum negative value among all the Euclidean distances, an offset value of +10 may be selected, and may be added to all the Euclidean distances. With such addition, the Euclidean distances for various time segments may become 110, 100, 80, 40, 0, 50, 60, 20, 40, 5, 30, and 35.

Referring again to FIG. 2, the plurality of representative points augmented with signed values may be provided to the data clustering unit 210. The data clustering unit 210 may cluster the plurality of representative points using one or more data clustering techniques.

In one embodiment, a first data clustering technique, for example K-means clustering, may be used for clustering the plurality of representative points. K-means clustering is a centroid-based algorithm used for grouping the plurality of representative points into K clusters. K-means clustering is an iterative clustering technique Where similarity within the plurality of representative points is derived by the closeness of a representative point to a centroid of a cluster. At the beginning, a random value of K is selected to form clusters. For example, when a value of 2 is used for K, 2 clusters may be obtained. Within each cluster, total intra-cluster variation of each representative point from respective centroid should be minimum. K-means clustering is run, with different values of K, until a global optima is achieved. In another implementation, the value of K for the K-means clustering technique could be extracted from the baseline reference data.

In an aspect, to achieve an optimal number of clusters through the K-means clustering technique. Silhouette analysis may be employed. Silhouette analysis measures closeness of each representative point in a cluster with representative points in neighboring clusters. Silhouette score obtained through Silhouette analysis lies in a range of [−1, +1]. A value of +1 indicates that a representative point in a cluster is far away from a neighboring cluster and very close to the cluster into which the representative point is assigned. From several runs associated with K-means clustering, a run for which the Silhouette score is maximum may be finalized and number of clusters obtained in that run may be used for further analysis.

When K-means clustering is used as the first data clustering technique, on the plurality of representative points, the data clustering unit 210 may provide a plurality of clusters as an output. Each cluster among the plurality of clusters may contain at least one representative point of the plurality of representative points. Further, each cluster obtained as the output may include a cluster identify, a centroid of the cluster, a minimum value and a maximum value of the cluster, a count of the cluster, and a density of the cluster.

Figure 4:
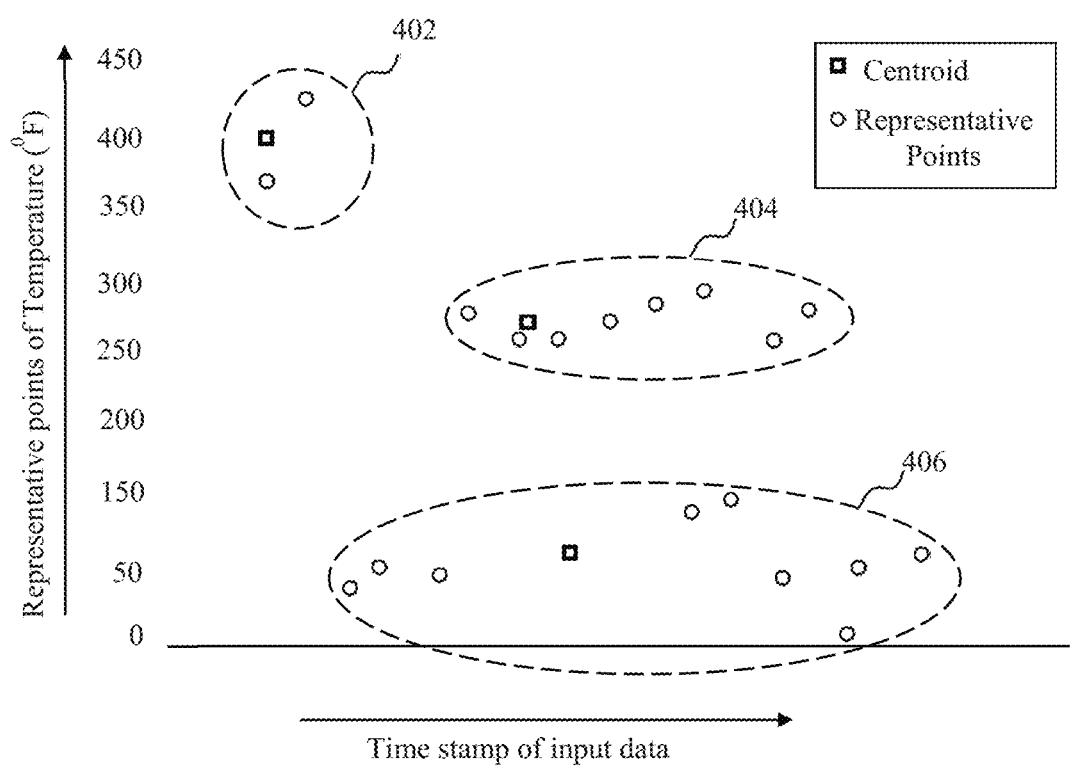
FIG. 4 illustrates an exemplary representation of a plurality of clusters formed by clustering a plurality of representative points, in accordance with an embodiment of the present disclosure.

FIG. 4 illustrates an exemplary representation of the plurality of clusters formed by clustering of the plurality of representative points. As illustrated in FIG. 4, each of the plurality of representative points is assigned to one of a first cluster 402, a second cluster 404, and a third cluster 406. Further, centroids are also determined for each of the first cluster 402, the second cluster 404, and the third cluster 406.

In one embodiment, a second data clustering technique, for example Agglomerative Hierarchical clustering, may be used by data clustering unit 210 for clustering the plurality of representative points. In one instance, the second data clustering technique may be applied in parallel to the first data clustering technique. In Agglomerative Hierarchical clustering, initially each representative point is considered as an individual cluster. Then, two nearest clusters are merged into one using a proximity matrix, in a hierarchical manner. Merging of the clusters is continued until only one cluster is left. In an aspect, a linkage matrix representing hierarchy of clusters arranged from shortest distance cluster to longest distance cluster is implemented. Further, the clusters along the hierarchy are segregated based on minimum or maximum values of clusters obtained, from the baseline reference data.

Although K-means clustering and Agglomerative Hierarchical clustering are mentioned to be utilized as the first data clustering technique and the second data clustering technique respectively, other data clustering techniques could also be used in other embodiments. Such other data clustering techniques may include Mean-shift clustering, Density-Based Spatial Clustering of Applications with Noise, and Gaussian Mixture Models.

In an embodiment, the plurality of clusters derived as outputs using the first data clustering technique and the second data clustering technique may be compared to identify presence of deviations, by the cluster resolving unit 212. In one instance, the deviations may be identified by comparing centroids, minimum values, and maximum values belonging to the plurality of clusters obtained using the first data clustering technique and the second data clustering technique. In case deviations are identified to be present and greater than a predefined threshold, the cluster resolving unit 212 may modify the predefined segment size to obtain a modified segment size.

Upon obtaining the modified segment size, a plurality of new representative points corresponding to new segments of the input data may be obtained using the modified segment size. The plurality of new representative points may be clustered in parallel, using the first data clustering technique and the second data clustering technique. New clusters obtained using the first data clustering technique and the second data clustering technique may be compared to identify deviations. Such process of modifying the predefined segment size and identifying deviations between outputs of data clustering techniques run based on the modified segment size may be performed for a predefined number of times. In one case, such process may be repeated till the deviations are either eliminated or identified to be persistent.

Referring again to FIG. 2, the plurality of clusters generated by the first data clustering technique may be provided to the outlier detection unit 214. The outlier detection unit 214 may detect a first outlier cluster based on one or more factors, such as a maximum distance of the plurality of clusters from a highest density cluster, and comparison of quantity and values of the plurality of representative points with predefined rules. For example, as illustrated in FIG. 4, the third cluster 406 can be identified as a highest density cluster having nine representative points. Further, the first cluster 402 may be identified as the first outlier cluster for being present at a maximum distance from the highest density cluster i.e. the third cluster 406. Although only one outlier cluster and one highest density cluster are illustrated in FIG. 4 for the ease of representation and understanding, multiple outlier clusters could be identified in a similar manner. For example, in a scenario when there are two highest density clusters, there could be at least two clusters at a maximum distance from each of the two highest density clusters. In such scenario, the at least two clusters present at farthest distances would be identified as outlier clusters.

In one implementation, the plurality of clusters generated by the second data clustering technique may also be sent to the outlier detection unit 214 for detection of a second outlier cluster. The first outlier cluster and the second outlier cluster may be compared, and if found to be different, the first outlier clusters may be resolved. At first, the one or more representative points present in the first outlier cluster and the second outlier cluster may be merged to obtain a joint outlier cluster. The joint outlier cluster may comprise a first set of representative points. Thereafter, a second set of representative points may be identified from a nearest k-means cluster. The second set of representative points may include a similar number of representative points as present in the joint outlier cluster. The first set of representative points and the second set of representative points may be grouped to obtain a grouped cluster. Further, data points of the input data corresponding to representative points present in the grouped cluster may be identified, and such data points may be clustered to obtain probable outlier clusters. Finally, an actual outlier cluster may be identified from the probable outlier clusters, based on a maximum distance from the highest density cluster, and comparison of quantity and values of the plurality of representative points with predefined rules. Further, a coefficient of variation associated with the actual outlier cluster may be determined, and may be provided to a user for analysis.

Referring again to FIG. 2, the plurality of clusters generated by the data clustering unit 210 may be provided to the data drift detection unit 216. The data drift detection unit 216 may identify data drift associated with the plurality of clusters. The data drift may be identified based on changes in densities of the plurality of clusters, occurring over a predefined period of time.

Figure 5A:
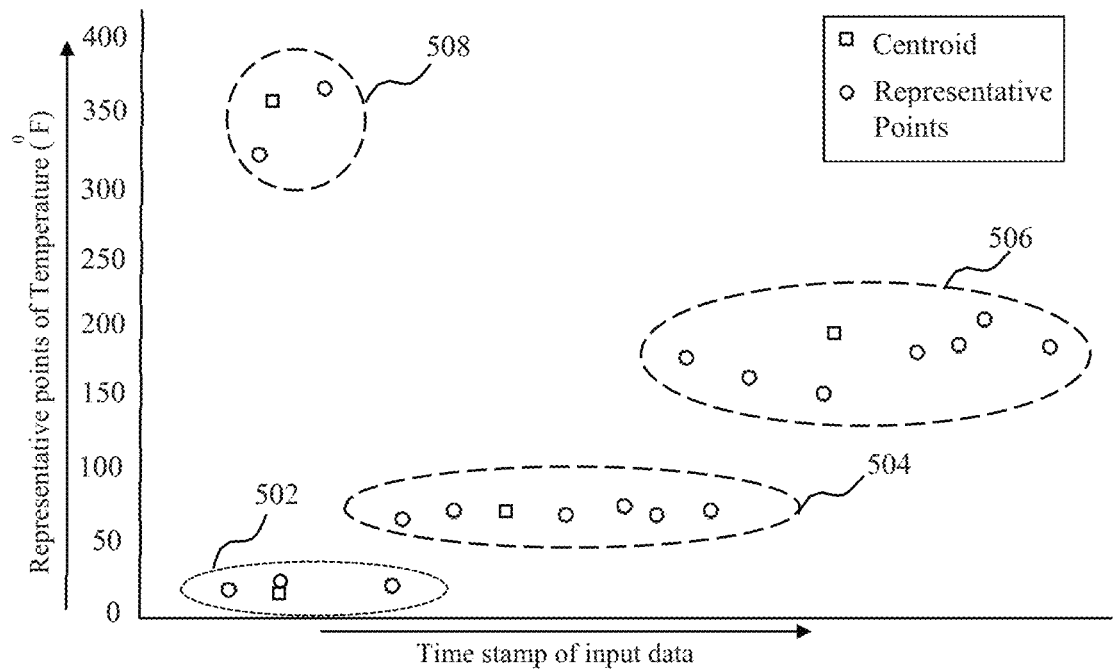
FIG. 5a illustrates an exemplary representation of plurality of clusters formed initially.
Figure 5B:
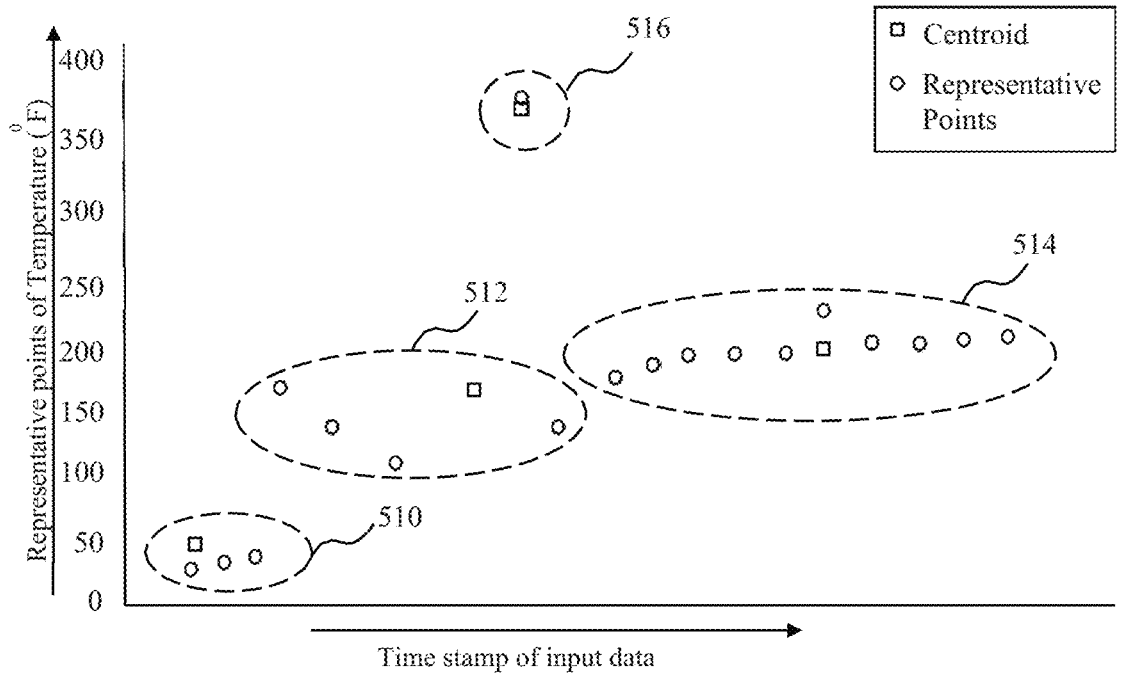
FIG. 5b illustrates an exemplary representation of the plurality of clusters formed after expiry of a predefined period of time, in accordance with an embodiment of the present disclosure.

FIG. 5A illustrates an exemplary representation of the plurality of clusters formed initially. FIG. 5A shows the plurality of representative points to be present in one of a first cluster 502, a second cluster 504, a third cluster 506, and a first outlier cluster 508. FIG. 5B illustrates an exemplary representation of the plurality of clusters formed after expiry of the predefined period of time. Similarly, FIG. 5B shows the plurality of representative points to be present in one of a fourth cluster 510, a fifth cluster 512, a sixth cluster 514, and a second outlier cluster 516. Although the number of clusters illustrated in FIG. 5A and FIG. 5B are equal, their densities are different for including different number of representative points. For example, the third cluster 506 includes seven representative points and its corresponding cluster i.e. the sixth cluster 514 includes ten representative points. Therefore, densities of the plurality of clusters change over a period of time, and such change in densities contribute to data drift, which is captured by the data drift detection unit 216.

A method for identifying data drift based on changes in densities of the plurality of clusters, over a predefined period of time, is now described. At first, densities of the plurality of clusters prepared by the data clustering unit 210 may be determined. The densities of the plurality of clusters may be determined immediately after formation of the plurality of clusters and after expiry of a predetermined period of time. In one implementation, a histogram algorithm may be used to determine density i.e. distribution of the representative points present within each cluster, using min-max boundaries of each cluster. Specifically, a minimum value and a maximum value from each of the plurality of clusters may be utilized to divide the plurality of representative data points into a plurality of intervals. Such plurality of intervals may be referred to as buckets of histogram. A number of representative points in each interval may be determined by the histogram algorithm to determine densities corresponding to the plurality of clusters. Output obtained by usage of the histogram algorithm may be saved as density sets corresponding to the plurality of clusters.

Thereupon, a cross-correlation may be performed between two related density sets. For example, Pearson's correlation may be performed between a density set of a cluster prepared before and a density set of a cluster prepared after, expiry of the predefined period of time. In case bin counts are different between two density sets, fillers with zero values are added to a density set having less bin count.

Results of the cross-correlation may be compared with predefined thresholds to identify data drift. In one case, a result of the cross-correlation may be compared with a first predefined threshold for example, "0.7". A strong cross-correlation may be established when the result of the cross-correlation is identified to be greater than the first predefined threshold. Such strong cross-correlation would indicate similarity in the densities across the clusters prepared over the predefined period of time, thereby indicating consistency of the input data.

In another case, the result of the cross-correlation may be compared with a second predefined threshold, for example "0.5". A weak cross-correlation may be established when the result of the cross-correlation is identified to be lesser than the second predefined threshold. Such weak cross-correlation would indicate changes in the densities across the clusters prepared over the predefined period of time, thereby indicating inconsistency of the input data.

In yet another case, the result of the cross-correlation may be identified to have a negative value i.e. a value lesser than "0". A negative value of the result of the cross-correlation may indicate a significant drift in density across the clusters prepared over the predefined period of time. When such negative values are identified for consecutive iterations, oscillations in the input data may be identified instead of data drift. In such case, the density sets of such clusters are merged and a merged density set may be retained for successive assessment, for example to identify causes of the oscillations in the input data.

Referring again to FIG. 2, the detection unit 212 may combine and store information corresponding to the first outlier cluster and the data drift in a first data package. The first data package may be utilized for updating the data model. In an aspect, the first data package is transmitted to the cloud server 106 for updating the data model.

As described above in several embodiments, by processing of the input data at the edge system 102, outlier clusters may be identified by the outlier detection unit 214, and the data drift may be identified by the data drift detection unit 216. Such information related to the outlier clusters and the data drift may be aggregated at the edge system 102 and may be communicated to the cloud server 106, as the first data package.

Figure 6:
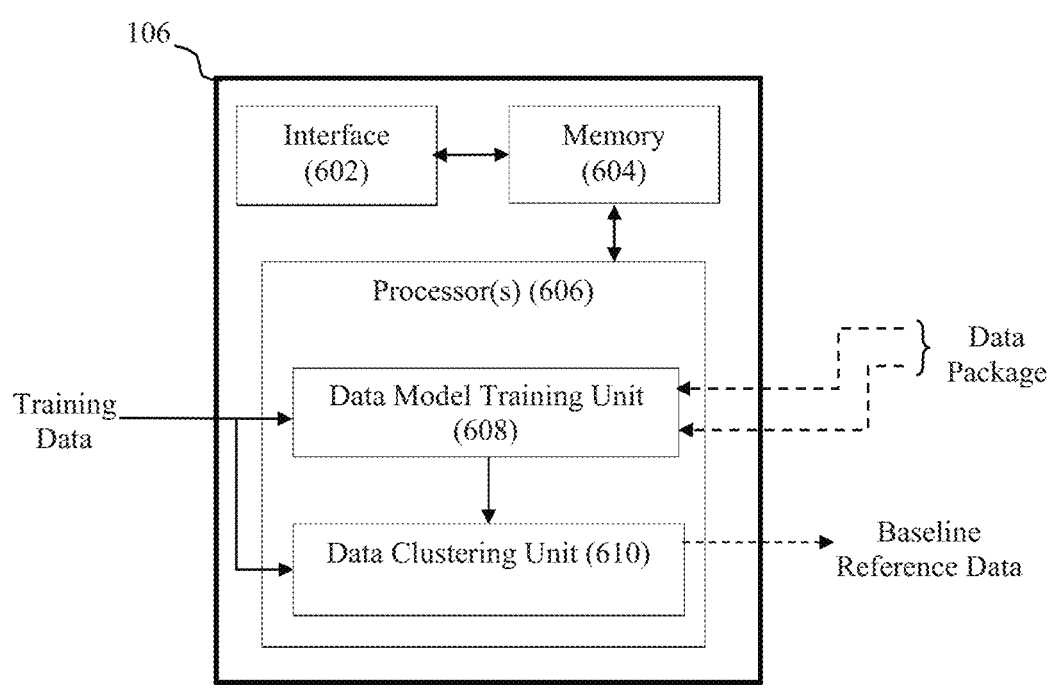
FIG. 6 illustrates a block diagram of a cloud server for updating a data model, in accordance with an embodiment of the present disclosure.

FIG. 6 illustrates a block diagram of the cloud server 106 for updating the data model, in accordance with an embodiment of the present disclosure. As illustrated, the cloud server 106 may comprise an interface 602, memory 604, and processor(s) 606. The processor(s) 606 may include a data model training unit 608 and a data clustering unit 610.

The data model training unit 608 may receive the first data package from the edge system 102. The first data package comprising the information related to the outlier clusters and the data drift may be used for updating the data model already prepared by the cloud server 106 and deployed at the edge system 102. In one implementation, weights of the data model may be adjusted based on the information related to the outlier clusters and the data drift, to obtain an updated data model. The updated data model may be validated by the data model training unit 608, using training data. The updated data model may then be deployed at the edge system 102 to provide prediction data that is accurate.

The updated data model may also be used by the data clustering unit 610 for generation of the baseline reference data at the cloud server 106. To generate the baseline reference data, prediction data generated from the updated data model and the training data may be provided to the data clustering unit 610. The data clustering unit 610 may utilize a data clustering technique, such as K-means technique, to develop a plurality of baseline clusters from the prediction data and the training data. The baseline reference data may be derived from at least one ideal cluster selected from the plurality of baseline clusters. The baseline reference data may comprise information such as a cluster minimum value, a cluster maximum value, centroids, cluster densities for a defined set of input data, and a set of values from a highest density cluster. After being determined at the cloud server 106, the baseline reference data may be sent as a second data package to the edge system 102. The baseline reference data may then be used at the edge system 102 for reducing the input data in successive iterations, for detection of new outliers and new data drift.

Accordingly, the above described system and method provides determining information corresponding to data drift and outliers at edge system, communication of such information to cloud servers instead of communicating entire input data streams, and updating of data models using the information received at the cloud servers. Determining, communicating, and using only the information corresponding to data drift and outliers allows saving of time, bandwidth, and computing power required for updating the data models. Further, the data models updated using the information related to the data drift and the outliers would provide i.e. predict accurate outputs that could be used for decision making in a designated application.

A method of updating a data model is now described. At first, input data may be reduced based on baseline reference data, to obtain a plurality of representative points. The input data may comprise data received from a data source, and/or prediction data obtained from a data model. The baseline reference data may be derived by clustering of training data used for training the data model and predicted output obtained from the data model. The baseline reference data may comprise a cluster minimum value, a cluster maximum value, centroids, cluster densities for a defined set of input data, and a set of values from the highest density cluster.

The plurality of representative points may be clustered to generate a plurality of clusters, using a first data clustering technique. A suitable data clustering technique, such as K-means clustering, Agglomerative Hierarchical clustering, Mean-shift clustering, Density-Based Spatial Clustering of Applications with Noise, or Gaussian Mixture Models may be used to cluster the plurality of representative points. Each cluster among the plurality of clusters may comprise one or more representative points of the plurality of representative points.

A first outlier cluster may be detected from the plurality of clusters. The first outlier cluster may be detected based on a maximum distance of the plurality of clusters from a highest density cluster. Further, the first outlier cluster may also be detected based on comparison of quantity and values of the plurality of representative points with predefined rules.

Data drift may be identified in the plurality of clusters generated over a predefined period of time. In an aspect, the data drift may correspond to changes in densities of plurality of clusters generated before and after the predefined period of time. The changes in densities may be determined by performing a cross-correlation, such as a Pearson's correlation, between respective clusters of the plurality of clusters, prepared before and after the predefined period of time.

The data model may be updated using information corresponding to the first outlier cluster and the data drift. Further, the baseline reference data used for reducing the input data may also be updated using an updated data model.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

In the above description, for purposes of explanation, numerous specific details are set forth in order to provide a thorough understanding of the present systems and methods. It will be apparent the systems and methods may be practiced without these specific details. Reference in the specification to "an example" or similar language means that a particular feature, structure, or characteristic described in connection with that example is included as described, but may not be included in other examples.

As used in the present specification, the term "machine learning" refers broadly to an artificial intelligence technique in which a computer's behaviour evolves based on empirical data. In some cases, input empirical data may come from databases and yield patterns or predictions thought to be features of the mechanism that generated the data. Further, a major focus of machine learning is the design of algorithms that recognize complex patterns and makes intelligent decisions based on input data. Machine learning may incorporate a number of methods and techniques such as; supervised learning, unsupervised learning, reinforcement learning, multivariate analysis, case-based reasoning, backpropagation, and transduction.

In the above description and figures, some example and/or implementations of systems and/or methods for updating a data model are described. As used herein, cloud server may be employed to provide a service, such as data processing, data communication, data storage, or any other product or activity that may be capable of running on the cloud server, or a cloud-based service. As used herein, the cloud server may be any appropriate combination of physical and virtual resources pooled for computing and/or storage purposes. For example, the cloud server may include any appropriate number of individual resources, servers, and server groups including virtual instances of resources, servers, and server groups. The cloud server may include any appropriate number of clouds and/or other network of resources accessible by the edge system.

Edge system may correspond to a device capable of processing/computing data received from data sources such as mobile devices, desktops, laptops, tablets, internet of things (IoT) devices, medical equipment, industrial equipment, automobiles and other vehicles, robots, drones, etc., may execute applications that include artificial intelligence/machine learning models i.e. data models. In some implementations, the edge system may receive data from sensors and other interfaces to capture input data for a data model for generation of prediction data, confidence scores, performance scores.

Implementations described hereinabove provide a system for data model management, data model deployment, data model feedback collection, data model re-training, etc. in support of applications executable on the edge system. Data models may be selected and deployed based on characteristics shared between the edge system and other edge systems, and/or the cloud server. Information received from the edge system may be used to update/re-train instances of data models, and the data models may be tracked, documented, and stored such that data models may be specifically managed and customized for a single edge system, a group of edge systems, etc. Data models are continuously or periodically monitored for accuracy, updated based on information, and deployed to various edge systems.

A computer network may be implemented using wired and/or wireless communication technologies. The computer network may comprise various network components such as switches, Provide Edge (PE) routers, Customer Edge (CE) routers, intermediate routers, bridges, computers, servers, and the like. The network devices present in the computer network may implement an Interior Gateway Protocol (IGP) including, but not limited to, Open Shortest Path First (OSPF), Routing Information Protocol (RIP), Intermediate System to Intermediate System (IS-IS), and Enhanced Interior Gateway Routing Protocol (EIGRP).

An interface may be used to provide input or fetch output from the system. The interface may be implemented as a Command Line Interface (CU), Graphical User Interface (GUI). Further, Application Programming Interfaces (APIs) may also be used for remotely interacting with edge systems and cloud servers.

A processor may include one or more general purpose processors e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

A memory may include, hut is no limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set as claimed in claims that issue from this application, in the specific form in which such claims issue, including any subsequent correction.

We claim:

1. A method comprising:
  processing input data, at an edge system, based on baseline reference data, to obtain a plurality of representative points, wherein the input data comprises at least one of data received from a data source and/or prediction data obtained from a data model, and wherein the plurality of representative points correspond to segments of the input data derived using a predefined segment size;
  clustering the plurality of representative points, at the edge system, to generate a plurality of clusters using a data clustering technique, wherein each cluster among the plurality of clusters comprises one or more representative points of the plurality of representative points;
  modifying the predefined segment size when deviations are identified between multiple sets of clusters of the plurality of representative points prepared using different data clustering techniques;
  detecting a first outlier cluster, at the edge system, from the plurality of clusters, based on at least one of a maximum distance of the plurality of clusters from a highest density cluster and/or comparison of quantity and values of the plurality of representative points with predefined rules, wherein a histogram algorithm is used to determine densities corresponding to the plurality of clusters;

identifying data drift, at the edge system, based on changes in densities of the plurality of clusters occurring over a predefined period of time;

generating a machine learning algorithm utilizing information corresponding to the first outlier cluster and the data drift; and applying the machine learning algorithm to train the data model to update the baseline reference data.

2. The method as claimed in claim 1, wherein the baseline reference data is derived by clustering of training data used for training the data model and predicted output obtained from the data model.

3. The method as claimed in claim 1, wherein the baseline reference data comprises at least one of a cluster minimum value, a cluster maximum value, centroids, cluster densities for a defined set of input data, and a set of values from the highest density cluster.

4. The method as claimed in claim 1, wherein the predefined segment size is updated based on variations in values of the data received from the data source.

5. The method as claimed in claim 1, further comprising:
obtaining a plurality of new representative points corresponding to new segments of the input data obtained using a modified segment size;
clustering the new representative points using at least two different data clustering techniques, to obtain multiple sets of new clusters, of the plurality of new representative points; and
identifying deviations between the multiple sets of new clusters,
wherein the obtaining, the clustering, and the identifying are performed until the deviations are either eliminated or identified to be persistent.

6. The method as claimed in claim 1, wherein the changes in densities are determined by performing a cross-correlation between respective clusters of the plurality of clusters prepared before and after the predefined period of time.

7. The method as claimed in claim 1, further comprising resolving the first outlier cluster by:
identifying a second outlier cluster by applying a second data clustering technique on the plurality of representative points, wherein the second outlier cluster comprises one or more representative points of the plurality of representative points;
merging the one or more representative points present in the first outlier cluster and the second outlier cluster to obtain a joint outlier cluster comprising a first set of representative points;
identifying a second set of representative points from a nearest k-means cluster, wherein the second set of representative points includes a similar number of representative points as present in the joint outlier cluster;
grouping the first set of representative points and the second set of representative points to obtain a grouped cluster;
identifying data points of the input data corresponding to representative points present in the grouped cluster and clustering the data points to obtain probable outlier clusters; and
identifying an actual outlier cluster from the probable outlier clusters, based on at least one of a maximum distance from the highest density cluster and comparison of quantity and values of the plurality of representative points with predefined rules.

8. The method as claimed in claim 1, further comprising updating baseline reference data based on clustering of updated prediction data and the training data, using at least one data clustering technique, wherein the updated prediction data is obtained from an updated data model and the training data corresponds to labelled data used for training the updated data model.

9. An edge system comprising:
a processor; and
a memory coupled with the processor, the memory storing programmed instructions, which when executed by the processor, causes the processor to:
process input data, based on baseline reference data, to obtain a plurality of representative points, wherein the input data comprises at least one of data received from a data source and prediction data obtained from a data model, and wherein the plurality of representative points correspond to segments of the input data derived using a predefined segment size;
cluster the plurality of representative points to generate a plurality of clusters using a first data clustering technique, wherein each cluster among the plurality of clusters comprises at least one representative point from the plurality of representative points;
modify the predefined segment size when deviations are identified between multiple sets of clusters of the plurality of representative points prepared using different data clustering techniques;
detect a first outlier cluster from the plurality of clusters, based on at least one of a maximum distance of the plurality of clusters from a highest density cluster and comparison of quantity and values of the plurality of representative points with predefined rules, wherein a histogram algorithm is used to determine densities corresponding to the plurality of clusters;
identify data drift, based on changes in densities of the plurality of clusters over a predefined period of time;
generate a machine learning algorithm utilizing information corresponding to the first outlier cluster and the data drift; and
apply the machine learning algorithm to train the data model to update the baseline reference data.

10. The edge system as claimed in claim 9, wherein the baseline reference data is derived by clustering of training data used for training the data model and predicted output obtained from the data model.

11. The edge system as claimed in claim 9, wherein the baseline reference data comprises at least one of a cluster minimum value, a cluster maximum value, centroids, cluster densities for a defined set of input data, and a set of values from the highest density cluster.

12. The edge system as claimed in claim 9, wherein the predefined segment size is updated based on variations in values of the data received from the data source.

13. The edge system as claimed in claim 9, further comprising:
obtaining a plurality of new representative points corresponding to new segments of the input data obtained using a modified segment size;
clustering the new representative points using at least two different data clustering techniques to obtain multiple sets of new clusters of the plurality of new representative points; and identifying deviations between the multiple sets of new clusters, wherein the obtaining, the clustering, and the identifying are performed until the deviations are either eliminated or identified to be persistent.

14. The edge system as claimed in claim 9, wherein the changes in densities are determined by performing a cross-correlation between respective clusters of the plurality of clusters prepared before and after the predefined period of time.

15. The edge system as claimed in claim 9, further comprising resolving the first outlier cluster by:

identifying a second outlier cluster by applying a second data clustering technique on the plurality of representative points, wherein the second outlier cluster comprises one or more representative points of the plurality of representative points;

merging the one or more representative points present in the first outlier cluster and the second outlier cluster to obtain a joint outlier cluster comprising a first set of representative points;

identifying a second set of representative points from a nearest k-means cluster, wherein the second set of representative points includes similar number of representative points as present in the joint outlier cluster;

grouping the joint outlier cluster and the second set of representative points to obtain a grouped cluster;

identifying data points of the input data corresponding to representative points present in the grouped cluster and clustering the data points to obtain probable outlier clusters; and identifying an actual outlier cluster from the probable outlier clusters, based on at least one of a maximum distance from the highest density cluster and comparison of quantity and values of the plurality of representative points with predefined rules.

16. A cloud server comprising:

one or more processors; and one or more memories coupled with the one or more processors, the one or more memories storing programmed instructions, which when executed by the one or more processors, causes the one or more processors to:

receive information corresponding to an outlier cluster and data drift;

generate a machine learning algorithm using the information corresponding to the outlier cluster and the data drift;

apply the machine learning algorithm to train a data model; and update baseline reference data based on clustering of updated prediction data, using at least one data clustering technique, wherein the updated prediction data is obtained from the trained data model, wherein the information corresponding to the outlier cluster and the data drift is received from an edge system configured to:

process input data, based on baseline reference data, to obtain a plurality of representative points, wherein the input data comprises at least one of data received from a data source and prediction data obtained from a data model, and wherein the plurality of representative points correspond to segments of the input data derived using a predefined segment size;

cluster the plurality of representative points to generate a plurality of clusters using a first data clustering technique, wherein each cluster among the plurality of clusters comprises at least one representative point from the plurality of representative points;

modify the predefined segment size when deviations are identified between multiple sets of clusters of the plurality of representative points prepared using different data clustering techniques;

detect the outlier cluster from the plurality of clusters based on at least one of a maximum distance of the plurality of clusters from a highest density cluster and comparison of quantity and values of the plurality of representative points with predefined rules, wherein a histogram algorithm is used to determine densities corresponding to the plurality of clusters; and identify the data drift based on changes in densities of the plurality of clusters over a predefined period of time.

17. The cloud server as claimed in claim 16, wherein the edge system is further configured to:

obtain a plurality of new representative points corresponding to new segments of the input data obtained using a modified segment size;

cluster the new representative points using at least two different data clustering techniques, to obtain multiple sets of new clusters, of the plurality of new representative points; and identify deviations between the multiple sets of new clusters, wherein the obtaining, the clustering, and the identifying are performed until the deviations are either eliminated or identified to be persistent.

18. The cloud server as claimed in claim 16, wherein the changes in densities are determined by performing a cross-correlation between respective clusters of the plurality of clusters prepared before and after the predefined period of time.

19. The cloud server as claimed in claim 16, wherein the edge system is further configured to resolve the first outlier cluster by:

identifying a second outlier cluster by applying a second data clustering technique on the plurality of representative points, wherein the second outlier cluster comprises one or more representative points of the plurality of representative points;

merging the one or more representative points present in the first outlier cluster and the second outlier cluster to obtain a joint outlier cluster comprising a first set of representative points;

identifying a second set of representative points from a nearest k-means cluster, wherein the second set of representative points includes a similar number of representative points as present in the joint outlier cluster;

grouping the first set of representative points and the second set of representative points to obtain a grouped cluster;

identifying data points of the input data corresponding to representative points present in the grouped cluster and clustering the data points to obtain probable outlier clusters; and identifying an actual outlier cluster from the probable outlier clusters, based on at least one of a maximum distance from the highest density cluster and comparison of quantity and values of the plurality of representative points with predefined rules.

20. The cloud server as claimed in claim 16, wherein updating baseline reference data is further based on clustering of training data, wherein the training data corresponds to labelled data used for training the trained data model.

* * * * *